(12) United States Patent
Pfitzmann

(10) Patent No.: US 7,571,237 B2
(45) Date of Patent: Aug. 4, 2009

(54) DETERMINING AN APPLICABLE POLICY FOR AN INCOMING MESSAGE

(75) Inventor: Birgit M. Pfitzmann, Samstagern (CH)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 11/333,178

(22) Filed: Jan. 17, 2006

(65) Prior Publication Data

US 2006/0168332 A1    Jul. 27, 2006

(51) Int. Cl.
*G06F 15/16* (2006.01)

(52) U.S. Cl. ............ 709/228; 709/203; 709/204; 709/220; 709/230; 709/250

(58) Field of Classification Search ............ 709/203, 709/204, 220, 228, 230, 250
See application file for complete search history.

(56) References Cited

U.S. PATENT DOCUMENTS 7,310,684 B2 * 12/2007 Patrick et al. ............ 709/238
7,478,161 B2 * 1/2009 Bernet et al. ............ 709/228
2005/0080914 A1 * 4/2005 Lerner et al. ............ 709/230

OTHER PUBLICATIONS

J. Rosenberg, David L. Remy: "Securing Web Services with WS-Security" 'Online! May 12, 2004, Sams Publishing, USA, XP002355718.

* cited by examiner

*Primary Examiner*—Michael Won
(74) *Attorney, Agent, or Firm*—Vazken Alexanian

(57) ABSTRACT

Provides methods, apparatus and systems for determining an applicable policy for an incoming message having a service-level addressing element. A method includes the following steps: a) applying a potentially applicable policy (P1) on the incoming message to make the service-level addressing element of the incoming message visible, b) if the service-level addressing element of the incoming message gets visible and is the one to which the currently applied policy (P1) is associated, the currently applied policy (P1) is determined to be the applicable policy, and if not associated c) repeating steps a) and b) with a further potentially applicable policy (P2 . . . Pn).

1 Claim, 3 Drawing Sheets

DETERMINING AN APPLICABLE POLICY FOR AN INCOMING MESSAGE

TECHNICAL FIELD

The present invention relates to a method, apparatus and a corresponding computing device for determining an applicable policy for an incoming message having a service-level addressing element. The method can be used for example for internet or intranet web services.

BACKGROUND OF THE INVENTION

A service provider, e.g. a web service provider, offers certain digital services typically to multiple potential clients, wherein these services are described for example in a web-service description language (WSDL), or in any other interface description language suitable for the type of services offered. The clients can find this description, e.g., by out-of-band transmission, from registries, or via web searches at the service provider. For many reasons, it might by desirable that the service provider associates policies with these services. In the context of this entire patent application, policies may be almost anything that the service provider wants to announce to its clients in addition to the pure service description, e.g., requirements that messages have to be encrypted or authenticated, requirements on certified attributes the client has to present, access-control policies that the service provider enforces, privacy policies that the service provider promises, compression algorithms that it understands, auditing that it promises, or quality of service that it offers. Sometimes the service provider may even only know internally that it has such requirements or follows privacy or audit policies. Such individual, domain-specific policies may be combined into an overall policy. In "Web Services Policy Framework (WS-Policy), F. Curbera et al., Version 1,0, Dec. 18, 2002, retrieved from

|  | https://www. |
|---|---|
| followed by: | sdn.sap.com/content_documents/ |
| followed by: | Web%20Services%20Policy%20Framework.pdf, current version, September 2004, retrieved from ftp://www6.software.ibm. |
| followed by: | com/software/developer/library/ws-policy.pdf, | a web-services policy framework is described, in the following also referred to as "WS-Policy". WS-Policy is a framework for combining arbitrary policies with operators such as "All" or "OneOrMore". Most of the prior frameworks are specific for access control, i.e., Boolean decision policies, or combine policies according to an internal structure, e.g., they only combine different conditions or actions. The IETF Policy Core Information Model PCIM as specified in "Policy Core Information Model—Version 1 Specification", B. Moore et al., Feb. 2001, retrieved from

|  | http://www. |
|---|---|
| followed by: | ietf.org/rfc/rfc3060.txt, and in "Policy Core Information Model (PCIM) Extensions", B. Moore, January 2003, retrieved from http://www. |
| followed by: | ietf.org/rfc/rfc3460.txt describes such a policy framework for an internal structure. |

The association of policies with services, i.e., describing which policy applies to which service, can have a policy-external part, saying "for these services, the following policies are applicable", and a policy-internal part, saying "apply this policy only if one of the following sub-services is called" or "apply this policy only if the called sub-service fulfils the following condition". At least a rudimentary policy-external part is always recommended because one cannot look all over the world which policies internally say that they apply to a certain service. For WS-Policy, fine-grained policy-external association was chosen and specified in the standards proposal "Web Services Policy Attachment (WS-PolicyAttachment)", F. Curbera et al., Version 1,0, Dec. 18, 2002, retrieved from

|  | https://www. |
|---|---|
| followed by: | sdn.sap.com/content_documents/ |
| followed by: | Web%20Services%20Policy%20Attachment.pdg current version, September 2004 from ftp://www6.software. |
| followed by: | ibm.com/software/developer/library/ws-polat.pdf, also referred to as the "WS-PolicyAttachment". In contrast, PCIM largely chose an internal association approach by policy conditions. |

The WS-PolicyAttachment leads to the impression that given an incoming message there is exactly one applicable policy, determined by the exact sub-service that this message addresses: For WSDL as the service definition language, WS-PolicyAttachment makes this fine-grained association by associating ("attaching") polices with service-structuring elements like WSDL portTypes, ports, operations, and input messages. Within WS-PolicyAttachment it is defined how policies are inherited along these service-structuring elements of an overall WSDL definition, which essentially form a hierarchy, i.e., a tree-like structure where children nodes correspond to subsets of sub-services, and are merged into one applicable policy for each finest sub-service, called "effective policy". Thus, as long as one does not attach different policies to two WSDL definition files of the same service, the applicable policy for each incoming message should be uniquely defined. Having just one applicable policy for each incoming message is a very useful feature, because then all preferences or orders among the sub-policies can be determined by the operators of WS-Policy and their semantics, while otherwise they are undefined. PCIM might however lead to undefined situations in cases where multiple policies apply and describe message transformations or state changes, not just Boolean expressions.

The common way to associate policies with services is to associate them with the service structure as WS-PolicyAttachment does. The idea is that every incoming message is addressed to a particular sub-service, and the recipient looks up the policy for this sub-service and applies it to the message. However, it has not yet been addressed how the association of a policy can be achieved for transformational policies, such as encryption and compression. These policies transform the message such that the service-level addressing element (e.g., in terms of WSDL operations) is not visible in the incoming message.

Consequently, it is desired to provide a method and a corresponding computing device for determining an applicable policy for an incoming message which enables to determine the applicable policy also if the incoming message comprising the service-level addressing element is transformed, for example by encryption or by data compression.

SUMMARY OF THE INVENTION

Therefore, according to a first aspect of the present invention, there is provided a method for determining an applicable policy for an incoming message. The method according to the invention includes a service-level addressing element and the following steps: a) applying a potentially applicable policy to the incoming message to make the service-level addressing element of the incoming message accessible; b) if the service-level addressing element of the incoming message becomes accessible and proves to be a service-level addressing element to which the currently applied policy is associated, the currently applied policy is determined to be the applicable policy, otherwise, steps a) and b) are repeated with a further potentially applicable policy.

According to another aspect of the invention, there is provided a computer program element for determining the applicable policy for an incoming message. The computer program element according to the invention includes computer program code for performing steps according to the above mentioned method when loaded in a digital processor of a computing device.

According to a further aspect of the invention, there is provided a computing device for determining the applicable policy for an incoming message. A computing device for determining an applicable policy for an incoming message having a service-level addressing element referring to the above mentioned method includes a recipient for receiving the incoming message, and a policy evaluation engine for applying a potentially applicable policy to the incoming message and for evaluating whether the potentially applicable policy is determined to be the applicable policy.

According to another aspect of the present invention, in a preprocessing step, which is normally processed before applying a potentially applicable policy, it is defined to what extent the transformation prescribed in the potentially applicable policy shall be processed. With that, the period for determining an applicable policy can be minimized.

BRIEF DESCRIPTION OF THE DRAWINGS

The invention and its embodiments will be more fully appreciated by reference to the following detailed description of presently Advantageous but nonetheless illustrative embodiments in accordance with the present invention when taken in conjunction with the accompanying drawings, in which.

Figure 1:
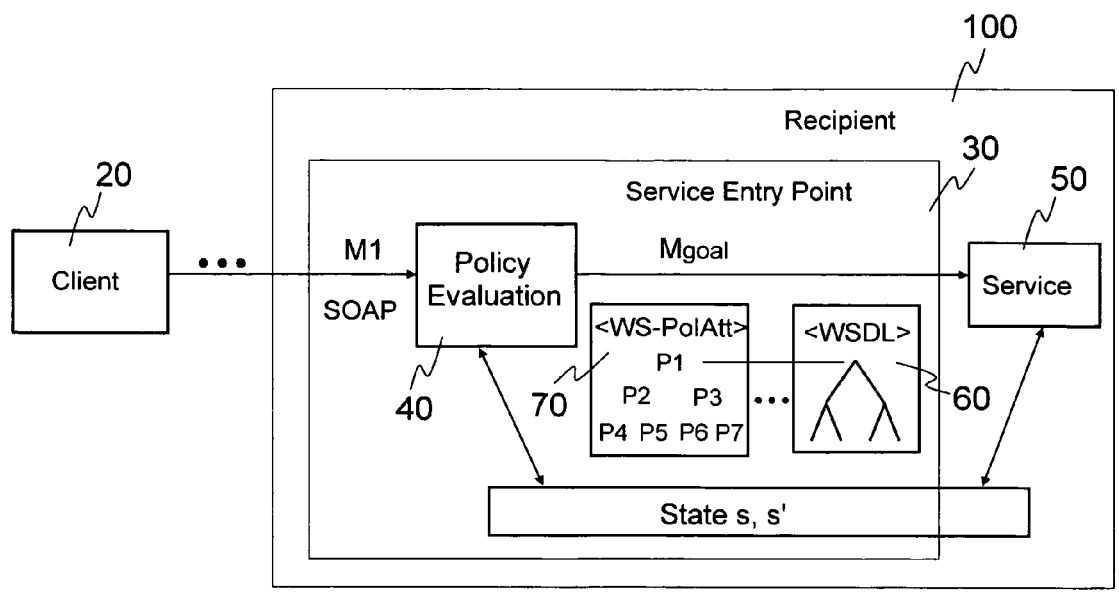
FIG. 1 shows a block diagram for the evaluation of an incoming message M1.

| REFERENCE SIGNS | |
|---|---|
| 20 | client |
| 30 | service entry point |
| 40 | policy evaluation engine |
| 50 | web services |

-continued

| REFERENCE SIGNS | |
|---|---|
| 60 | WSDL-component |
| 70 | WS-Policy attachment component |
| 100 | recipient or service provider |
| P1-P7 | policies |
| PC6.1-PC6.32 | policy components |
| PC7-PC9 | further policy components |
| PCcut | child policy or policy component on the cut line |
| CL | cut line |
| m | input message |
| mcut | message after applying child policy PCcut |
| m' | output message |
| Mcut | set of possible messages after applying child policy PCcut |
| M | set of possible messages after applying the policy operator OP(PC 1, . . ., PCn) |
| M1 | incoming message |
| Mgoal | goal message |
| ServAdrx | sub-service address to which the message M1 is related |
| Servx | sub-service address to which the policy Px is associated |

DETAILED DESCRIPTION OF THE INVENTION

The present invention provides methods, apparatus and systems for determining an applicable policy for an incoming message. An example of a method according to the invention includes a service-level addressing element including the following steps of: a) applying a potentially applicable policy to the incoming message to make the service-level addressing element of the incoming message accessible; b) if the service-level addressing element of the incoming message becomes accessible and proves to be a service-level addressing element to which the currently applied policy is associated, the currently applied policy is determined to be the applicable policy, and otherwise, the steps a) and b) are repeated with a further potentially applicable policy.

The invention also provides a computer program element for determining the applicable policy for an incoming message. The computer program element according to the invention includes computer program code for performing steps according to the above mentioned method when loaded in a digital processor of a computing device.

The invention also provides a computing device for determining the applicable policy for an incoming message. An example of a computing device for determining an applicable policy for an incoming message has a service-level addressing element referring to the above mentioned method, and includes a recipient for receiving the incoming message, and a policy evaluation engine for applying a potentially applicable policy to the incoming message and for evaluating whether the potentially applicable policy is determined to be the applicable policy. Advantageously, the service-level addressing element is considered to be accessible when it has a valid syntax, i.e., when the transformed message comprises any syntactically correct service-level addressing element.

In an embodiment of a method according to the invention, the potentially applicable policy is applied on the incoming message only to the extent that the service-level addressing element of the incoming message becomes accessible. As a benefit, a period the evaluation engine needs to determine the applicable policy can be reduced.

In another embodiment of a method according to the present invention, the potentially applicable policy is applied to the incoming message by applying an initial part of a transformation to the incoming message, which initial part of a transformation is prescribed by the policy.

In a further embodiment of a method according to the invention, the initial part of the transformation is split up in transformation steps. After each transformation step an error evaluation is processed. With that the period for determining the applicable policy can be further reduced.

Furthermore, also the remaining part of the transformation can be applied to the message obtained by applying the initial part of the transformation on the incoming message. If the application of the remaining part of the transformation fails, the currently applied policy is rejected. Hence, the probability with which a potentially applicable policy is recognized as the actual applicable policy can be increased and the time period for yielding the goal message can be reduced.

Advantageously, the present invention in a preprocessing step normally processed before applying a potentially applicable policy, it is defined to what extent the transformation prescribed in the potentially applicable policy shall be processed. With that the period for determining an applicable policy can be minimized.

In an advantageous embodiment of the method according to the invention the preprocessing step includes the following steps: First, before the potentially applicable policy is applied, its policy components are determined. Then, it is determined whether a policy component is transforming the service address or is retaining the service address. Finally, the address-transforming policy component or components respectively are included in the initial part of the transformation.

According to a further embodiment, the address-retaining policy component or components respectively can be included in the remaining part of the transformation. Under certain circumstances however, there can be an exception of this rule. This occurs, when the address-retaining policy component is succeeded by an address-transforming policy component. In this case, the address-retaining policy component is preferably not included in the remaining part of the transformation. Thus, preferably, the address-retaining policy component is included only then in the remaining part of the transformation if the address-retaining policy component is not succeeded by an address-transforming policy component. Preferably, the preprocessing steps are applied to any policy available.

In another advantageous embodiment, equal initial parts of the transformations prescribed by the policies can be joined. With that, the period for determining the applicable policy can be further improved. Advantages of the apparatus, the computer program element and their embodiments go along with the advantages of the inventive method and its embodiments as described above.

FIG. 1 shows a service 50, its WSDL description 60, a policy evaluation engine 40 and a description of the attached policies 70. The policies P1, . . . P7, or generalized Pi, are attached to different nodes of the WSDL tree, as indicated for policy P1, which is attached to the top node of the service-tree. Which sub-service a message addresses can be seen when the message is in the form Mgoal, the final or goal form that is input to the service 50. However, each of the policies P1 may describe compressions; cryptions etc. such that the incoming message M1 might look completely different to transformed message Mgoal. Reference is made to "Web Services Security: SOAP Messages Security 1.0 (WS Security 2004)", A. Nadalin et al., March 2004, retrieved from followed by: http://docs.oasis-open.org/wss/2004/01/
followed by: oasis-200401-wss-soap-message-security-1.0.pdf.

Web-services encryption may encrypt the message part containing the service-level address element. This means that the policy evaluation engine 40 receiving the incoming message M1 a priori does not know which policy Pi to apply to this message M1.

Figure 2:
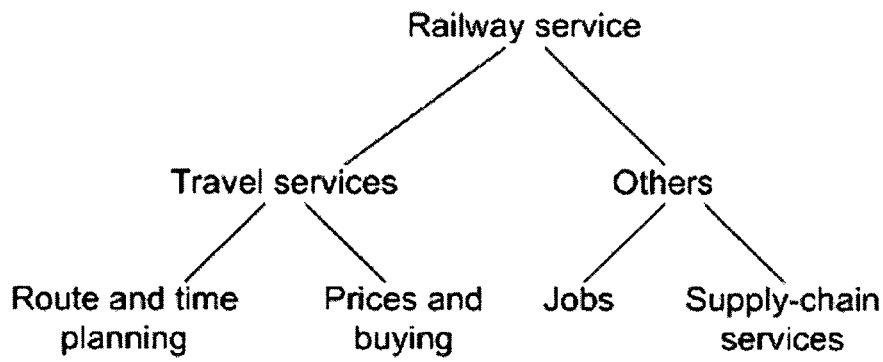
FIG. 2 shows an example of a service tree.
Figure 3:
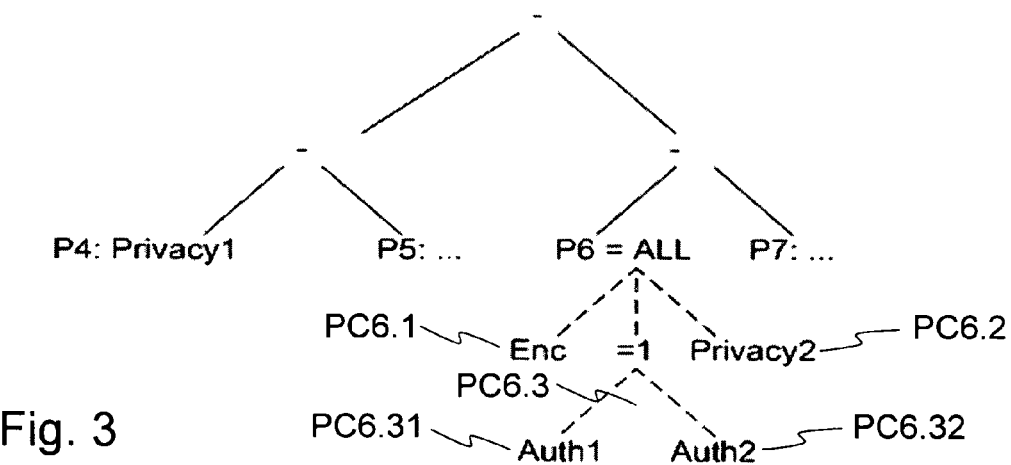
FIG. 3 shows an example of a policy tree associated to the service tree of FIG. 2.

The link between sub-services and policies is explained hereinafter by means of an example. As shown in FIG. 2, a railway provider offers a railway service comprising multiple sub-services, e.g., looking up of routes, departure and arrival times, costs of tickets, but also job application forms and services for its supply-chain partners. This service and its sub-services are not only offered to web browsers, but also to automated agents. For example, travel agencies may want to plan overall journeys for travelers using these railways among other means of transportation, and they may want to do this by an automated software program that uses this railway provider's route lookup service as a subservice. Hence the railway provider provides its route and time lookup services as web services with fixed formats for the input and output messages, e.g., route queries and returned routes. In FIG. 1, these services correspond to the web services 50 and the descriptions of their formats are the <WSDL> component 60. The structure of these services is depicted in the service tree, which is also shown in the <WSDL> component 60. In the example in question the top distinction is between "travel services" and "others", and next "travel services" is divided into "route and time planning" and "prices and buying", whereas the sub-service "others" is divided into two further sub-services "jobs" and "supply-chain services". As shown in FIG. 1 the policies Pi can be attached by means of the component <WS-PolAtt> 70 to these services. The service tree of the example is shown in FIG. 2 and the policy tree which is linked to the service tree is shown in FIG. 3. For example, policy P4, which is attached to the sub-service "route and time planning" might be a privacy policy for people who just look up routes. Policy P6, attached to the sub-service "jobs", might require authentication of the applicant, contain a different privacy policy (longer retention of data, but stronger secrecy from third parties), and also contain an encryption policy for confidentiality of the applicant data and the potential resulting offer.

In the example, policy P6 consists of three policy components, a first policy component PC6.1 for encryption, a second one PC6.2 for privacy, and a third policy component PC6.3 for authentication. The policy components PC6.1-PC6.3 are combined with an operator ALL. The best order is that the encryption is "outside", i.e., the encryption is last applied by the client 20 who sends a message to this service and first removed by the service in the policy evaluation 40. The policy component for authentication PC6.3 in this example can be further refined by saying that exactly one of two types of authentication PC6.31 or PC6.32 is required. The selection between the two policy components for authentication PC6.31 or PC6.32 is carried out by the operator ExactlyOne, shown as "=1" in FIG. 3. Now, the policy P6 comprises four policy components PC6.1, PC6.2, PC6.31 and PC 6.32. In FIG. 3, the labels "Enc", "Authl" etc. are abbreviations for actual policy components in certain policy languages. It should be noticed, that this example has no policies P1, P2, P3.

In another example policy P1, which is attached to the top node and thus to all services, could indicate that the service provider always uses secure channels to communicate.

Assuming now there is an incoming message M1 to the sub-service "jobs". The "real" message Mgoal may be of the following form (abbreviated from actual WSDL-described messages):

```
<JobApplication>
    <Name>Joe Smith</Name>
    <DesiredJob>Train driver</DesiredJob>
    <Qualifications>License</Qualifications>
</JobApplication>
```

According to the policy P6, first authentication Auth1 or Auth2 was added to this message and then it was encrypted. Hence, in the incoming message M1 none of the message fields shown above are accessible—also referred to as visible—any more. In particular, the policy evaluation engine 40 no longer sees the outermost field "JobApplication" which distinguishes that this is a message for the sub-service "jobs". The field "JobApplication" is a service-level addressing element of this message, i.e., it says to which of all the services of this railway server the message is addressed. Consequently, the service-level addressing element is not accessible. If any of the other policies (here policy P5 or policy P7) also prescribes encryption, the message M1 could be as well for one of those. If these policies prescribe encryption with different keys, the policy evaluation engine 40 cannot even just decrypt, then look. The other policies might also prescribe other transformations that scramble message fields, e.g., compression.

Given that an incoming message is addressed to a particular sub-service, and the recipient looks up the policy for this sub-service and applies it to the message, the present idea relates to how an applicable policy can be identified even transformational policies, such as e.g. encryption or compression policies, which policies transform the message such that the service-level addressing element (e.g., in terms of WSDL operations) is not visible in the incoming message.

The idea as applicable to a computing device according to the diagram in FIG. 1 is to evaluate a potentially applicable policy on the incoming message M1 as far as it is necessary to make the service-level addressing element/s of the final transformed message Mgoal visible. The potentially applicable policy can be selected, e.g. randomly, from a list of potentially applicable policies available. After having applied the potentially applicable policy to parts of or the entire message M1 as received it can be determined from the results of applying such policy—which result is an intermediate message—whether the result is of valid syntax at all and if yes, what sub-service it addresses. If the intermediate message is valid and the sub-service addressed is the one to which the currently applied policy is associated, it is decided that this potentially applicable policy—maybe selected out of multiple available policies—is indeed the applicable policy, and the policy evaluation is finalized. If one of both conditions fails—i.e. either the result of applying the potentially applicable policy is a not a valid service-level addressing element, or the resulting service-level addressing element indicates a sub-service to which the currently applied policy is not associated to (which can e.g. be automatically be looked up in some table mapping policies to sub-services via service-level addressing elements)—then the selected potentially applicable policy is rejected as applicable policy, and another potentially applicable policy will be selected and applied to the incoming message.

Figure 4:
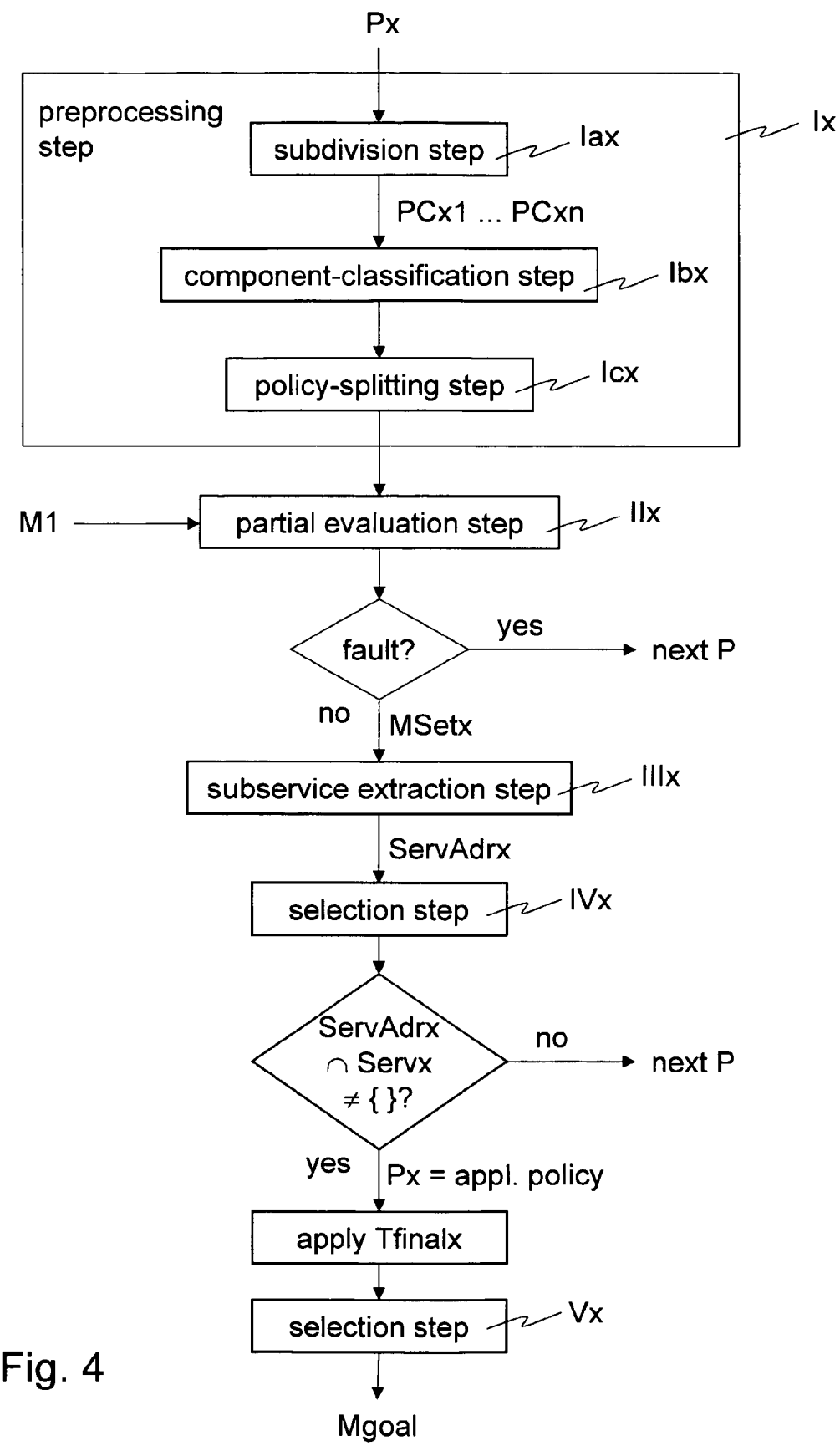
FIG. 4 shows a flow diagram for a method for determining an applicable policy according to the invention.

From the point of view of the policy evaluation engine 40 at a service entry point 30 of a recipient 100, who preferably is a web service provider, an embodiment of the method as illustrated in FIG. 4 in combination with FIG. 1 comprises determining an applicable policy P for an incoming message M1, wherein the incoming message M1 fulfills for example the simple object access protocol (SOAP). Therefore, a set S of possibly or potentially applicable policies P1 to Pn is provided, wherein each potentially applicable policy Px in the set S of potentially applicable policies prescribes a transformation Tx of incoming messages M1 when applied to such message. Each potentially applicable policy Px is furthermore associated with a sub-service Servx of the services 50 available for incoming messages at the service entry point 30. For each potentially applicable policy Px in the set S of potentially applicable policies, the following steps are processed until the applicable policy P has been determined.

According to FIG. 4, a partial-evaluation step IIx is applied to the incoming message M1 yielding a set of possible messages MSetx or a fault. Therefore, in the partial-evaluation step IIx an initial part T-Inix of the transformation Tx prescribed by the possibly applicable policy Px is applied to the incoming message M1. If in the partial-evaluation step IIx a fault occurs, the following steps can be omitted for the possibly applicable policy Px and instead the next possibly applicable policy Px+1 is applied to the incoming message M1.

Next, a sub-service-extraction step IIIx is carried out, wherein a set of addressed sub-services ServAdrx is derived from the set of possible messages MSetx. The set of sub-service addresses ServAdrx are service addresses to which the incoming message M1 relates.

Now, a selection step IVx is processed, wherein it is determined whether the set of addressed sub-services ServAdrx and the sub-service Servx associated with the possibly applicable policy Px contain a common sub-service. If a common sub-service is found, the possibly applicable policy Px is determined to be the applicable policy P for the incoming message M1.

It should be noted that the expression "sub-service" may also mean a group of operations, ports etc. in the WSDL sense. It should also be noted that the expression "initial part T-Inix" can typically be a—eventually non-exact matching—prefix of the sequence of computation steps in the entire transformation Tx; at least the outputting of the set of possible messages MSetx is new.

In the following, further improvements and embodiments of the method for determining the applicable policy are described.

Finalizing the Policy Application:

Once the applicable policy P has been determined to be Px, it is evaluated on the incoming message M1, yielding the final message Mgoal. This may be done by applying only the remaining part T-finalx of the transformation Tx after the initial part T-Inix. Therefore, it is typically helpful to retain a more detailed internal state of the transformation Tx than just the set of possible messages MSetx.

The method for determining the applicable policy should guarantee that the sub-service addressed by the final message Mgoal after evaluation of the entire transformation Tx is always within the set of addressed sub-services ServAdrx derived in the sub-service-extraction step IIIx. Therefore the method may include after applying the remaining part T-finalx of the transformation Tx a further selection step Vx, in which the sub-service addressed by the final message Mgoal and the sub-service Servx which is associated with policy Px are compared. The sub-service addressed by the final message Mgoal is hereinafter also called final sub-service.

If the evaluation of the determined applicable policy P leads to a rejection of the incoming message M1, either because the rest T-finalx of the transformation Tx fails, or because the sub-service addressed by the final message Mgoal is not the sub-service Servx associated with the policy Px, the applicable policy P=Px is afterwards rejected because of non-applicability and one may try to find further applicable policies.

Early Stopping:

The initial part T-Inix of the transformation Tx may be split up further into substeps. Thereby, if an error occurs after a substep, the partial evaluation IIx can be stopped earlier. For certain policies, e.g., partial encryption, one may even constrain the set of addressed sub-services successively, e.g., one might see the WSDL portType already after one part of the transformation, and the WSDL operation after the next part of the transformation. Then one can check for each new constraint, whether the remaining set of addressed sub-services still has a non-empty intersection with the sub-service Servx associated with the policy Px.

How Far to Evaluate:

To what extent a transformation is executed in the partial-evaluation step IIx is preferably determined in a preprocessing step Ix for each potential applicable policy Px. The preprocessing step Ix needs to be done only once per policy Px, and not once per incoming message M1 like the other steps mentioned above. The efficiency of the overall method is largely determined by the quality of this preprocessing step Ix. Details of the partial-evaluation step Ix depend on both, the policy framework (here WS-Policy) and the individual domain policies used in it.

The preprocessing step Ix for a potential applicable policy Px preferably comprises the following partial steps:

With the help of a subdivision step Iax, policy components PCx1, . . . , PCxn of the potentially applicable policy Px are determined. For WS-Policy the policy components can be the domain-specific policies from which the policy expression Px is constructed with policy operators. Generally the decomposition can be such that everything that might transform the message is part of one of these components.

With the help of a component-classification step Ibx each policy component PCxi is classified as service address-transforming policy component or service address-retaining policy component. Policy components PCxi classified as service address-retaining keep the service-level address element of a message unchanged, except that they are allowed to fail completely. This may happen for example for an access-control policy. The access-control policy may reject the message, but does not change the message. The method remains correct if a policy component is classified as address-transforming even though it is address-retaining (always or in its current context). However, the finer the classification is carried out here, the earlier the trial evaluations can be stopped. For example, one can roughly classify all cryptographic policies as address-transforming policy components and all access-control policies as address-retaining policy components. Or one can classify the cryptographic policies finer and distinguish encryption policies as address-transforming policy components and security-token policies as address-retaining policy components, because they only add elements to a message. Or one can even classify the encryption policies finer according to whether the service-level address in the message is encrypted.

With the help of a policy-splitting step Icx the initial part T-Inix of the transformation Tx is determined such that the remaining part T-finalx only consists of policy components PCxi that have been classified as address-retaining.

The split of the transformation Tx does not always give two valid policy parts according to the policy language. E.g., in WS-Policy a policy Px is a tree of policy operators and a split does not trivially result trees again. This implies that what constitutes a valid initial part can depend not only on the syntax of the policies but also on the semantics, i.e., on how a policy, which is typically a text, is interpreted as a transformation.

Policy Splitting for WS-Policy:

For WS-Policy a transformational semantics can be defined, which complements the Boolean semantics sketched in WS-Policy itself. In the following, the policy splitting is presented in details for an example of semantics. Given such example, the principles can also be transferred to other semantics of the same or other policy languages. A recursive approach can even be seen as a meta-method.

Figure 5:
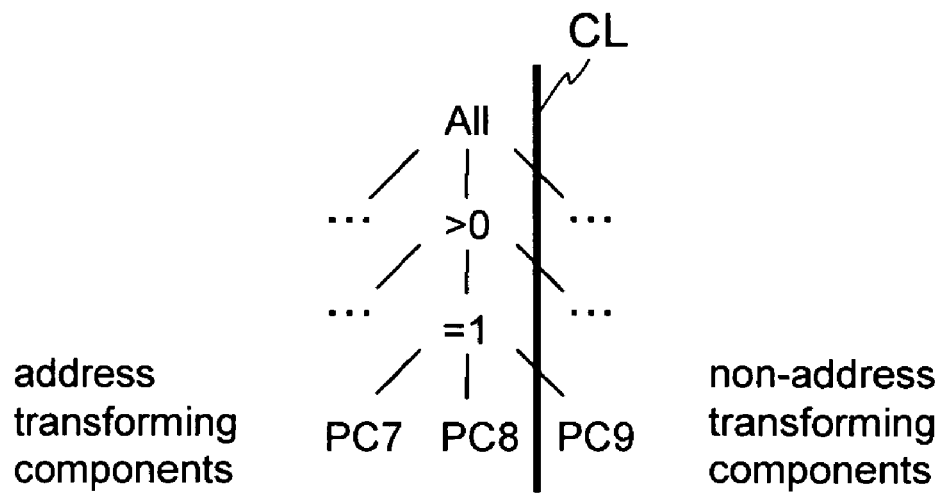
FIG. 5 shows a diagram illustrating an example of policy splitting.

An example policy is shown in FIG. 5. There are operators All, OneOrMore, shown in FIG. 5 as ">0", and ExactlyOne, shown as "=1", on policy components and partial policy expressions. Further, there are so-called usage types, which can be seen as unary operators. The example shows a part of a policy tree. The policy components PCi are the leaves of the policy tree, while the inner nodes of the tree are operators. It is assumed that the leaves are numbered left-to-right, and that the policy component PC7 and PC8 are address-transforming, while all policy components from PC9 onwards are address-retaining, i.e. non-address transforming. Thus the trial evaluation of this policy should be interrupted prior to applying policy component PC9. The thick vertical line characterizes the border between address transforming policy components and non-address transforming policy components, i.e. address-retaining policy components.

By well-known techniques one can find the path in the policy tree leading to the cut between the leaves, find the affected operators and find which of their direct children are on the left side of the cut line CL, on the cut line CL, and on the right side of the cut line CL.

Usage types are unary operators and thus not affected by a cut. However, some usage types prevent any message transformation, hence they can be used to designate entire subtrees as address-retaining although some contained policy components are address-transforming.

Figure 6:
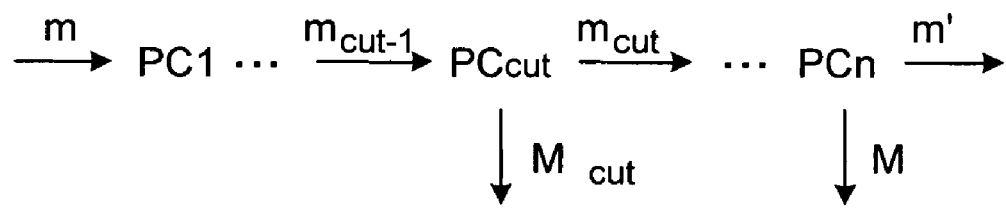
FIG. 6 shows a diagram illustrating a notation used for policy splitting for an operator within a policy tree.

The semantics of the other operators is defined recursively. Hereinafter, it is shown how an arbitrary operator OP in the tree is affected by a cut among its children. FIG. 6 shows the notation for the example "All". The operator OP has child policies, policy components or also called subpolicies PC1, . . . , PCn, where one of them, namely the subpolicy PCcut, may be cut. The input message to this evaluation of the operator OP is called m and the output message m'. The input message to the subpolicy PCcut is mcut-1, and its output message, if evaluated completely, is mcut. Instead, it now yields a set of possible messages Mcut. From this message Mcut a set of possible messages M for the entire operator OP shall be derived, such that the address of the output message m' is contained in the addresses of the message set M. The output "failed" is always allowed in the message set M and is not mentioned again.

In the following the operator OP=All is explained. Its semantics simply applies one child policy after the other from left to right, as shown in FIG. 6. Hence the message set M can be set to M :=Mcut. The reason is that after applying the child policy PCcut the service address is never changed again. Only the entire evaluation may still fail.

The operator OP=OneOrMore works as follows. Its semantics tries to apply one child policy after the other as it is shown in FIG. 6. However, now if one of these child policy applications PC1 . . . PCn fails, the previous message is taken again. At the end it is verified that at least one child policy did not fail. Hence, the message set M is set to Mcut augmented by mcut-1.

Finally, the operator OP=ExactlyOne works as follows. Its semantics tries to apply each child policy to the initial or input message m input to the operator OP (i.e., not as in FIG. 6). If this policy application succeeds for exactly one child policy, the result of that evaluation is taken. This means that this child policy is the applicable one. If a second success is found, the evaluation fails. If one of the child policies before the child policy PCcut succeeded, let the message m" be its result. If the message m" exists, the message set is set to the set {m"}, because either this first result is used or the operator OP fails. If the message m" does not exist, the result may be that of the child policy PCcut, or that of a later child policy, which will have the same service address as m, or the operator OP may fail again. Hence in this case the message set M is set to Mcut augmented by m.

Joining Common Initial Transformation Parts:

The preprocessing step or phase Ix may also discover that certain policies Px, Py have equal initial parts T-Inix=T-Iniy, so that the partial-evaluation step IIx and the sub-service-extraction step IIIx for these policies Px, Py are the same and need to be processed only once.

In the best case, all policies Pi whose initial part T-Inii is non-empty (i.e., all address-transforming overall policies) have the same initial part T-Ini.

Instead of entirely equal initial parts T-Inix, T-Iniy the policies Px, Py may share shorter initial parts T-Ini-shortx, T-Ini-shorty which are not sufficient to apply the sub-service-extraction step IIIx after them. In this case, the intermediate result after evaluation of one of these policies, say Px, can be stored for use to more quickly evaluate the entire initial part T-Iniy of the transformation Ty.

A policy-attachment specification may simplify this step by immediately writing common initial parts of policies only once. Given WS-Policy, this is one potential interpretation of the undefined operator "merge"; e.g., policies attached higher in a hierarchy could be interpreted to precede policies attached lower in a hierarchy, and thus a common initial part could simply be attached to the top node in a hierarchy. This is particularly useful if all messages to a certain service are to be encrypted, and encryption is the only address-transforming sub-policy in use at that service and not used except for this outermost encryption of all messages.

In the following, further embodiments are described.

The potentially applicable policies Px in the set S of potentially applicable policies may be given a defined order to minimize the expected time to determine the applicable policy for each incoming message M1. This can be done by a shortest-evaluation first strategy, or by weighting with the probability of each policy according to a statistics of sub-service usage at this service.

If an unsuccessful evaluation of a sub-policy causes state changes in the service, e.g., logging of unsuccessful queries to an access-control engine, the order of evaluation plays a role. Most of the optimizations influence the number of sub-policies which are evaluated unsuccessfully. If the resulting state changes and their order are considered essential for a service, which is assumed to be a rare case, one should fix one of the above mentioned methods for this service. If, on the other hand, the state changes are undesired in trial evaluations, a useful method is for the individual policy handlers to come with trial-evaluation methods that do not make the state changes.

In one embodiment of the method, all policies P1 . . . Pn are evaluated until the end, i.e., the initial part T-Inix of each transformation Tx is set to the entire transformation Tx: T-Inix:=Tx.

The method according to the invention can be used on recipient side 100 as well as on client side 20. If for example, the client 20 gets an answer from the recipient 100 and has policies therefor, the method can also be used on the client side.

Computer program element in the present context means any expression, in any language, code or notation, of a set of instructions intended to cause a system having an information processing capability to perform a particular function either directly or after either or both of the following a) conversion to another language, code or notation; b) reproduction in a different material form.

Having illustrated and described an advantageous embodiment for a novel method for determining an applicable policy for an incoming message having a service-level addressing element, it is noted that variations and modifications in the method can be made without departing from the spirit of the invention or the scope of the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for determining an applicable policy for an incoming message comprising a service-level addressing element, comprising the steps of:
   a) applying a potentially applicable policy to the incoming message to make the service-level addressing element of the incoming message accessible,
   b) if the service-level addressing element of the incoming message becomes accessible and is a service-level addressing element to which the currently applied policy is associated, determining the currently applied policy as applicable policy, and
   c) if not associated repeating steps a) and b) with a further potentially applicable policy,
   wherein the service-level addressing element becomes accessible when it shows a valid syntax, and,
   further comprising:
      applying the potentially applicable policy to the incoming message only to the extent that the service-level addressing element of the incoming message becomes accessible,
      applying the potentially applicable policy by applying an initial part of a transformation to the incoming message, which initial part of a transformation is prescribed by the policy,
      for an initial part of the transformation comprising transformation steps: processing an error evaluation after having processed a transformation step,
      applying the remaining part of the transformation to the message obtained by applying the initial part of the transformation on the incoming message, and
      rejecting the currently applied policy if the remaining part of the transformation fails;
   providing a definition for the initial part of a transformation before applying the potentially applicable policy comprising this transformation;
   before the potentially applicable policy is applied to the incoming message:
      determining policy components of the potentially applicable policy,
      determining whether a policy component is an address-transforming policy component or an address-retaining policy component, and
      including any address-transforming policy component in the initial part of the transformation; and
   including any address-retaining policy component in the remaining part of the transformation;
   joining equal initial parts of the transformations prescribed by the policies,
   applying the potentially applicable policy to the incoming message only to the extent that the service-level addressing element of the incoming message becomes accessible;
   applying the potentially applicable policy by applying an initial part of a transformation to the incoming message, which initial part of a transformation is prescribed by the policy; and
   for an initial part of the transformation comprising transformation steps, processing an error evaluation after having processed a transformation step.

* * * * *